United States Patent [19]

Ubukata et al.

[11] 4,058,271
[45] Nov. 15, 1977

[54] EMERGENCY LOCKING RETRACTOR FOR SEAT BELT ASSEMBLIES

[75] Inventors: Susumu Ubukata; Yasukazu Mizutani; Syozo Iyoda; Hiroshi Aoi, Ichinomiya, all of Japan

[73] Assignee: Susumu Ubukata, Nagoya, Japan

[21] Appl. No.: 771,827

[22] Filed: Feb. 24, 1977

[30] Foreign Application Priority Data

| Mar. 2, 1976 | Japan | 51-22878 |
| July 20, 1976 | Japan | 51-86869 |
| Aug. 18, 1976 | Japan | 51-98350 |

[51] Int. Cl.$^2$ .................... A62B 35/02; B65H 75/48
[52] U.S. Cl. .................... 242/107.4 B; 242/107.4 A
[58] Field of Search ............ 242/107.4 R–107.4 E; 297/388; 280/744–747

[56] References Cited

U.S. PATENT DOCUMENTS

| 2,979,282 | 4/1961 | Barecki | 242/107.4 B |
| 3,865,329 | 2/1975 | Higbee et al. | 242/107.4 B |
| 3,991,953 | 11/1976 | Takada | 242/107.4 B X |

FOREIGN PATENT DOCUMENTS

| 1,282,577 | 7/1972 | United Kingdom | 242/107.4 B |

*Primary Examiner*—Stanley N. Gilreath
*Assistant Examiner*—John M. Jillions

[57] ABSTRACT

In a seat belt retractor having a reel to which a belt is anchored at one end and which is spring biased pawl is pivotally mounted on a retractor frame for movement into and out of engagement with a pair of ratchet-toothed flanges provided on the reel. Disposed coaxially with the reel are a cam wheel rotatable simultaneously therewith and an inertia wheel rotatable through a predetermined angle relative to the cam wheel. These wheels have on and along their peripheries protuberances which are disposed at a predetermined pitch. During rotation of the reel in a direction of belt extension at relatively low acceleration, the inertia wheel is rotated in synchronism with the cam wheel via a spring. This spring yields, upon a high acceleration being imparted to the reel in the direction of belt extension, to permit the inertia wheel to lag behind the cam wheel by the predetermined angle. The lagging of the inertia wheel behind the cam wheel is sensed by a follower lever associated with the locking pawl, whereupon the locking pawl engages the pair of ratchet-toothed flanges of the reel thereby locking the same against any further rotation in the direction of belt extension. Several embodiments are disclosed.

18 Claims, 30 Drawing Figures

EMERGENCY LOCKING RETRACTOR FOR SEAT BELT ASSEMBLIES

BACKGROUND OF THE INVENTION

This invention relates to seat belt assemblies for use, for example, on motor vehicles for minimizing the harmful results of a traffic accident, and more specifically to a retractor for such seat belt assemblies. Still more specifically, the invention deals with an emergency locking retractor for seat belt assemblies which is of the type having a locking mechanism activated upon extension of the belt, such as webbing or strap, at a high acceleration for immediately restraining the belt from any further extension.

SUMMARY OF THE INVENTION

It is an object of this invention to provide an emergency locking seat belt retractor of the type specified which is greatly simplified and inexpensive in construction but positive and reliable in operation.

Another object of the invention is to provide an emergency locking retractor which is locked automatically upon rapid extension of the belt within a minimum of time.

A further object of the invention is to provide an emergency locking retractor which is readily adaptable for use with an acceleration sensing mechanism such that the retractor can be locked in response to high acceleration and deceleration of the vehicle or the like.

A further object of the invention is to provide an emergency locking retractor which produces little or no noise in its normal use.

A further object of the invention is to provide an emergency locking retractor which is not to be locked accidentally upon full retraction of the belt.

A still further object of the invention is to provide an emergency locking retractor such that its major working parts will not easily wear out or become out of adjustment throughout the expected lifetime of the retractor.

According to this invention, there is provided an emergency locking retractor for a seat belt assembly comprising a frame, a reel rotatably supported by said frame and having a belt thereon, first resilient means urging said reel to rotate in a direction of belt retraction, toothed wheel means rotatable with said reel, said toothed wheel means having teeth or protuberances on and along its periphery at a predetermined pitch, a locking pawl pivotally mounted on said frame for movement into and out of engagement with said teeth or protuberances of said toothed wheel means, said locking pawl being effective to lock said reel against rotation in a direction of belt extension upon engagement with said toothed wheel means, inertia wheel means having protuberances on and along its periphery at the same pitch as said predetermined pitch and disposed in coaxial relationship to said toothed wheel means so as to be rotatable through a predetermined angle relative to the same, second resilient means for normally holding said inertia wheel means in a predetermined angular position relative to said toothed wheel means, wherein said protuberances of said toothed wheel means and of said inertia wheel means are at the same phase, and for permitting said inertia wheel means to rotate in synchronism with said toothed wheel means during normal rotation of said reel in the direction of belt extension at relatively low acceleration, said second resilient means yielding upon a high acceleration in excess of a predetermined value being imparted to said reel in the direction of belt extension to permit angular displacement of said inertia wheel means through said predetermined angle relative to said toothed wheel means so as to cause a difference in phase of said protuberances between the toothed wheel means and the inertia wheel means, as well as a change in combined peripheral contour formed by the protuberances of the toothed wheel means and the inertia wheel means, a pivotally supported follower lever following the combined peripheral contour formed by said protuberances, third resilient means urging said follower lever toward the peripheral contour whereby said follower lever is normally held in sliding contact with at least said toothed wheel means and oscillates in conformity with the combined peripheral contour, and means associating said follower lever with said locking pawl in a manner such that the locking pawl permits unobstructed passage therepast of said teeth or protuberances on said toothed wheel means during said normal rotation of the reel and, upon occurence of said change in combined peripheral contour, is held pivoted toward said toothed wheel means for engagement therewith.

The above and other objects, features and advantages of this invention and the manner of attaining them will become more apparent, and the invention itself will best be understood, upon consideration of the following detailed description taken together with the accompanying drawings showing some preferred embodiments of the invention.

DETAILED DESCRIPTION

Referring now in detail to the several embodiments herein chosen for the purpose of illustrating this invention, there is shown in FIGS. 1, 2 and 3A through 3D of the above drawings a particularly preferred emergency locking retractor for a seat belt assembly by way of one of such embodiments. The emergency locking retractor, generally designated by reference numeral 1 in FIGS. 1 and 2, broadly comprises a frame 2, a reel 3 rotatably supported by the frame and having a belt 4 wound thereon, a pair of flanges 5 fixed to the reel and each having a series of ratchet teeth 6 formed thereon, a locking pawl 7 pivotally mounted on the frame for movement into and out of simultaneous engagement with the ratchet-toothed flanges, a cam wheel 8 rotatable simultaneously with the reel, an inertia wheel 9 normally rotatable in synchronism with the cam wheel and, in the event of an emergency, lagging behind the cam wheel by a predetermined angle, and a follower lever 10 mounted on the locking pawl for sensing the lagging of the inertia wheel behind the cam wheel and for causing the locking pawl to engage the ratchet-toothed flanges and hence to lock the reel against rotation in the direction of belt extension.

Figure 1:
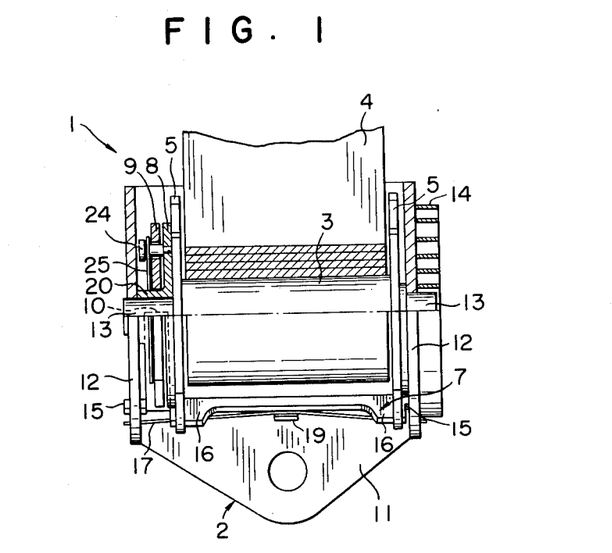
FIG. 1 is a front elevational view, partly in vertical section, of a preferred form of the emergency locking seat belt retractor according to this invention.
Figure 2:
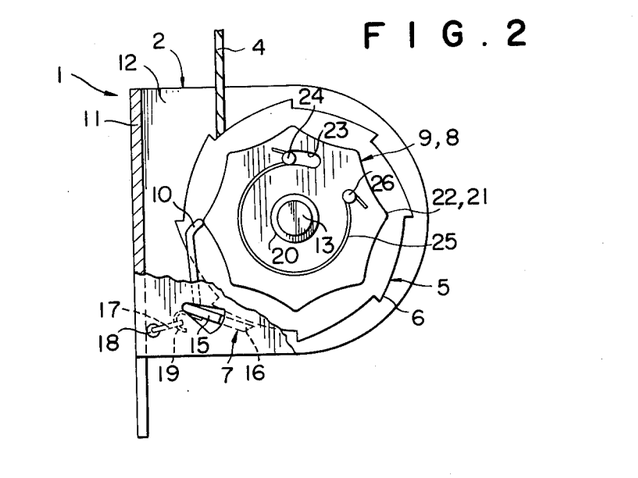
FIG. 2 is a left hand side elevational view of the retractor of FIG. 1, with the retractor being shown with one of the side walls of its frame partly broken away.

With reference directed more specifically to FIGS. 1 and 2, the frame 2 comprises a web 11 and a pair of flanges flanges or side walls 12, with the side walls being disposed in mutually spaced apart and parallel relationship to accommodate the reel 3 therebetween. The reel 3 is coaxially provided with a pair of journals 13, each projecting outwardly from one of the reel flanges 5, that are rotatably received respectively in a pair of aligned holes formed in the side walls 12 of the frame 2. The reel 3 together with its flanges 5 is therefore rotatable in both directions relative to the frame 2.

The belt 4, which may be of the type known either as webbing or as strap, has one of its ends securely anchored to the reel 3. This reel is resiliently urged to rotate in the direction of belt retraction as by a spiral spring shown at 14 in FIG. 1.

As mentioned previously, the pair of flanges 5 on the reel 3 have the ratchet teeth 6 formed thereon, and since the principal function of these toothed flanges is to lock the reel against rotation in the direction of belt extension in cooperation with the locking pawl 7, they will hereinafter be referred to as the ratchet wheels to facilitate description. The locking pawl 7 has a pair of lugs 15 which are received respectively in a pair of sectorial openings formed in the side walls 12 of the frame 2, in such a way that a pair of tongue-like portions 16 provided on the pawl is pivotally movable into and out of simultaneous engagement with the pair of ratchet wheels 5.

Rigidly connected to the locking pawl 7 is the follower lever 10 which extends upwardly therefrom for sliding contact with the periphery of the cam wheel 8 and, in the event of an emergency, also with that of the inertia wheel 9. A wire spring 17 has its end engaged respectively in a pair of holes 18 formed in the side walls 12 of the frame 2 and is further engaged at its midpoint by a hook 19 affixed to the locking pawl 7, so that the angled tip of the follower lever 10 is normally urged against the periphery of the cam wheel 8, whereas the locking pawl 7 is urged away from the pair of ratchet wheels 5. It is recognized, however, that the follower lever 10 can likewise be urged against the periphery of the cam wheel 8 by utilizing magnetic repulsion, instead of by being sprung as shown.

As best seen in FIG. 1, the cam wheel 8 is integrally provided with a sleeve 20 which is snugly fitted over the left hand journal 13, as viewed in the figure, of the reel 3. The inertia wheel 9 is slidably mounted on the sleeve 20 so as to be rotatable relative to the cam wheel 8 through a predetermined angle, as will be more fully apparent presently.

The cam and inertia wheels 8 and 9 are identical in shape, but in size the former is slightly larger than the latter, only to such an extent that the cam wheel is shown to be concealed behind the inertia wheel in FIG. 2. The cam and inertia wheels 8 and 9 have formed on their peripheries series of protuberances 21 (seen in FIGS. 3C and 3D) and 22, respectively, at the same angular spacings as the teeth 6 on the pair of ratchet wheels 5.

It will be noted from FIG. 2 in particular that the inertia wheel 9 has formed therein an arcuate guide slot 23 in which there is slidably received a pin 24 projecting laterally from one of the faces of the cam wheel 8. The inertia wheel 9 is therefore angularly displaceable relative to the cam wheel 8 through the angle determined by the length of the guide slot 23, which corresponds to approximately half the pitch of the protuberances 21 and 22 of the cam and inertia wheels.

A formed wire spring 25 has one of its ends anchored to the pin 24 and the other end to a spring retainer 26 on the inertia wheel 9 in order that the pin 24 will normally be positioned at the rear end of the guide slot 23 with respect to the direction of rotation of the cam and inertia wheels while the belt 4 is being payed out from the reel 3, which direction is clockwise as viewed in FIG. 2. Normally, therefore, the inertia wheel 9 may be considered to be held half the protuberance pitch in advance of the cam wheel 8 by the spring 25 with respect to the direction of their rotation during belt extension. It will also be noted from FIG. 2 that the protuberances 21 and 22 of the cam and inertia wheels 8 and 9 are aligned in the axial direction of the wheels in the normal operation condition of the emergency locking retractor 1.

Upon a high acceleration being imparted to the reel 3, and therefore to the cam wheel 8, in the direction of belt extension, the spring 25 yields to permit the inertia wheel 9 to lag behind the cam wheel by approximately half the pitch of their protuberances 21 and 22. The spring 25 thus functions to determine the threshold angular acceleration of the reel 3 in the direction of belt extension at which the retractor 1 is locked, as will be more fully understood as the description proceeds.

Figure 3A:
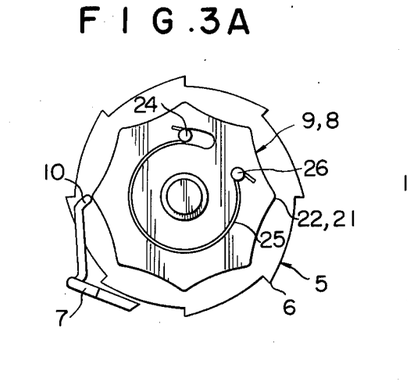
FIGS. 3A and 3B are partial side elevational views explanatory of the operation of the retractor of FIGS. 1 and 2 in its normal use.
Figure 3B:
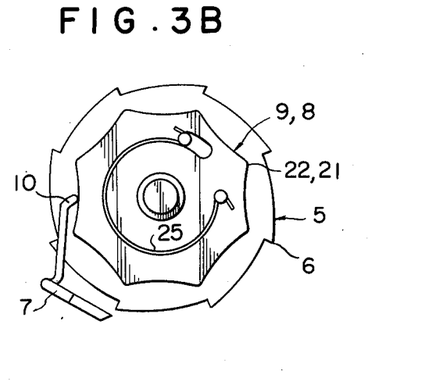

As depicted in FIG. 3A, when the angled tip of the follower lever 10 rides on one of the protuberances 21 of the cam wheel 8 in the normal operation condition of the retractor 1, the tips of the locking pawl 7 are each positioned intermediate the crests of two adjacent teeth 6 on one of the ratchet wheels 5. When the follower lever tip is positioned intermediate two adjacent protuberances 21 of the cam wheel 8 as shown in FIG. 3B, the locking pawl tips are each located over the crest of one of the teeth 6 on one of the ratchet wheels 5. Thus, during rotation of the reel 3 in the direction of belt extension at relatively low acceleration, the locking pawl 7 is pivoted toward and away from the pair of ratchet wheels 5 in an oscillatory manner so as to permit unobstructed passage therepast of the successive ratchet teeth 6.

Figure 3C:
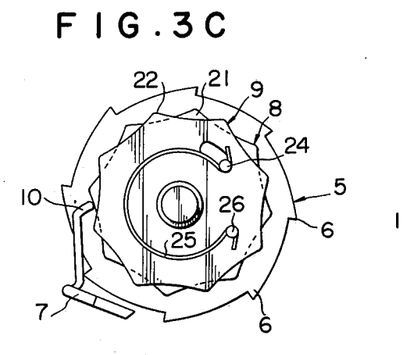
FIGS. 3C and 3D are also partial side elevational views explanatory of the operation of the retractor of FIGS. 1 and 2 during an emergency.
Figure 3D:
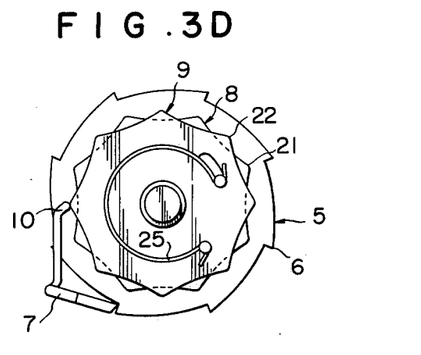

Upon a high acceleration in excess of a predetermined value being imparted to the belt 4, resulting in the angular acceleration of the reel 3 at the threshold rate, the spring 25 yields as aforesaid to permit the inertia wheel 9 to lag behind the cam wheel 8 by approximately half the pitch of their protuberances 21 and 22. The result is as illustrated in FIG. 3C. Since then the protuberances 22 of the inertia wheel 9 are disposed intermediate or alternately with, the protuberances 21 of the cam wheel 8, the locking pawl 7 is substantially held pivoted toward the pair of ratchet wheels 5 via the follower lever 10 against the force of the spring 17. The locking pawl 7 thus simultaneously engages the pair of ratchet wheels 5 as shown in FIG. 3D, thereby locking the reel 3 against rotation in the direction of belt extension.

While the operation of the emergency locking seat belt retractor 1 is believed to be clearly apparent from the foregoing description, further amplification will be made in the following brief summary of such operation. During the normal travel of a motor vehicle or the like equipped with the seat belt assembly incorporating the emergency locking retractor 1 according to the invention, the seat belt wearer is subject to comparatively small degrees of acceleration or deceleration. Although the belt 4 may be extended from, or retracted back into, the retractor 1 with such usual acceleration or deceleration of the vehicle, the consequent rotation of the reel 3 is not so rapid as to result in the lagging of the inertia wheel 9 behind the cam wheel 8 against the force of the spring 25. As a consequence, the locking pawl 7 merely oscillates so as to permit free rotation of the pair of ratchet wheels 5, as previously explained in connection with FIGS. 3A and 3B.

In the event of an emergency, such as a traffic accident causing rapid deceleration of the vehicle, the belt 4 extends so rapidly that inertia wheel 9 lags behind the cam wheel 8 against the force of the spring 25 as shown in FIG. 3C. The locking pawl 7 is then prevented from oscillating and is, instead, substantially held pivoted toward the pair of ratchet wheels 5 against the force of the spring 17. Thus, with the continued slight rotation of the reel 3, the locking pawl 7 simultaneously engages the pair of ratchet wheels 5 as in FIG. 3D thereby locking the reel against any further rotation in the direction of belt extension.

Upon cessation of the vehicle deceleration, the belt 4 loosens and is then retightened by being wound back onto the reel 3 by virtue of the energy stored in the spiral spring 14. The formed wire spring 25 also operates to return the inertia wheel 9 to its normal angular position relative to the cam wheel 8. Thereafter the belt 4 can be extended or retracted in the usual manner.

Figure 4A:
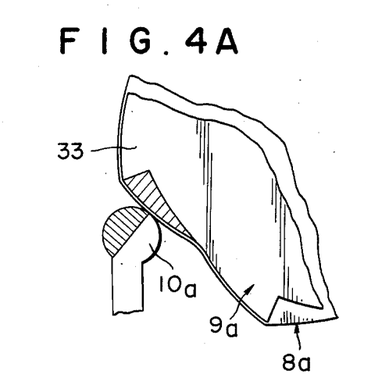
FIGS. 4A and 4B are fragmentary side elevational views showing a slight modification of the retractor of FIGS. 1 and 2, the views being also explanatory of the operation of the modified retractor.
Figure 4B:
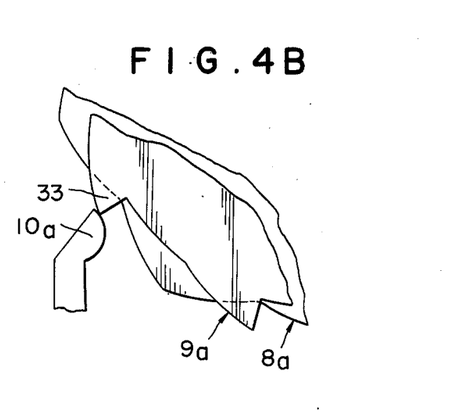

FIGS. 4A and 4B illustrate a slight modification of the preceding embodiment, with the modification being centered on the shape of the inertia wheel. The features and advantages of this modification, however, will be better understood by first considering FIGS. 5A and 5B which are intended to manifest a problem encountered with the retractor 1 of FIGS. 1 and 2.

Figure 5A:
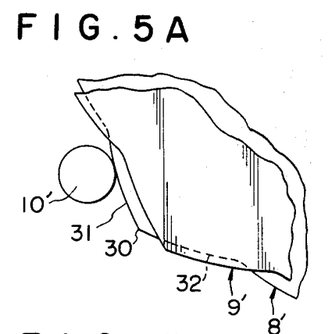
FIGS. 5A and 5B are views similar to FIGS. 4A and 4B but explanatory of a problem encountered with the retractor of FIGS. 1 and 2.
Figure 5B:
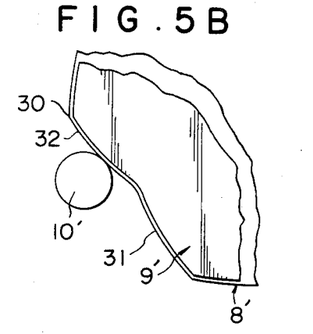

In FIGS. 5A and 5B are fragmentarily illustrated cam and inertia wheels 8' and 9' similar to the cam and inertia wheels 8 and 9 of the retractor 1, and a follower lever 10' which is shown as a circle to facilitate explanation. Each protuberance of, for example, the cam wheel 8' is composed essentially of a crest 30 and first and second slopes 31 and 32 on both sides of the crest. The first slope 31 of each cam protuberance will hereinafter be referred to as the front slope, and the second slope 32 as the rear slope, in consideration of the fact that the cam and inertia wheels rotate clockwise while the belt is being extended from the retractor.

As will be understood from a consideration of FIG. 5A, the inertia wheel 9' will commence lagging behind the cam wheel 8' immediately upon rapid extension of the belt 4 if the follower lever 10' at that time is disposed on the front slope 31 of one of the protuberances of the cam wheel. However, if the follower 10' is located on the rear slope 32 of one of the cam wheel protuberances upon rapid extension of the belt, as shown in FIG. 5B, then the inertia wheel 9' will be incapable of lagging immediately behind the cam wheel because the rear slope of one of the inertia wheel protuberances abuts against the follower lever. The inertia wheel commences lagging behind the cam wheel only when the follower lever rides on the front slope of the next cam wheel protuberance.

Thus, if the cam follower 10' is located on the rear slope 32 of one of the cam wheel protuberances upon rapid extension of the belt, the desired lagging of the inertia wheel 9' will be delayed for a length of time corresponding to half the pitch of cam wheel protuberances at the maximum. The response of the retractor is therefore not necessarily high.

The above explained problem encountered with the retractor 1 of FIGS. 1 and 2 is thoroughly overcome by the modification shown in FIGS. 4A and 4B, in which the cam and inertia wheels are designated by 8a and 9a, respectively, and the follower lever is designated by 10a. It will be seen that the inertia wheel 9a and the follower lever 10a are formed by removing the hatched portions of FIG. 4A from the inertia wheel 9' and the follower lever 10' of FIGS. 5A and 5B. Particular attention should be paid to the shape of the inertia wheel protuberances 33, which are shaped like ratchet teeth formed by cutting off the rear slopes from the protuberances of the cam wheel 8a. The cam wheel protuberances are identical with those of the cam wheel 8' shown in FIGS. 5A and 5B.

It will be apparent from a consideration of FIGS. 4A and 4B that the inertia wheel 9a commences lagging behind the cam wheel 8a, without being obstructed by the follower lever 10a, immediately upon rapid extension of the belt even if the follower lever is then located on the rear slope of one of the cam wheel protuberances. As will be noted by referring back to FIG. 3D, the locking pawl 7 engages the pair of ratchet wheels 5 when the follower lever rides on the crest of one of the protuberanes of the inertia wheel which has lagged behind the cam wheel. It is thus seen that the desired function of the inertia wheel 9a is not impaired if its protuberances 33 are shaped like ratchet teeth.

Figure 6:
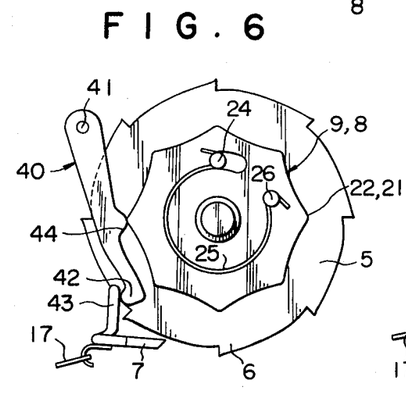
FIG. 6 is a partial side elevational view of another modification of the retractor of FIGS. 1 and 2.

FIG. 6 illustrated another slight modification of the retractor 1 of FIGS. 1 and 2. It should be understood that in this and all the subsequently presented modifications or embodiments of the invention, parts corresponding exactly to those of the retractor 1 will be identified by like reference numerals, and such corresponding parts will not necessarily be described in any detail.

The modified retractor of FIG. 6 is best characterized by a follower lever 40 interposed between the cam wheel 8 (and the inertia wheel 9) and the locking pawl 7 in order to magnify the motion imparted from the former to the latter. The following lever 40 has one of its ends pivotally pinned at 41 to the frame (such as that shown at 2 in FIGS. 1 and 2) of this modified retractor.

Formed on the other end of the follower lever 40 is a protuberance 42 disposed in abutting engagement with an upstanding member 43 which may be formed integral with the locking pawl 7. Another protuberance 44 is formed on the follower lever at a point intermediate both ends thereof for constant sliding contact with the cam wheel 8 and, in the event of an emergency, also with the inertia wheel 9. The wire spring 17 is dually effective to urge the follower lever 40 against the cam wheel 8 and to urge the locking pawl 7 away from the pair of ratchet wheels 5.

It will now be apparent that the motion of the cam wheel 8 can be magnified as it is communicated to the locking pawl 7 via the follower lever 40. This follower lever has the distinct advantage over the follower lever 10 of the retractor 1, in that the former enables the protuberances of the cam wheel 8 (and those of the inertia wheel 9) to be significantly reduced in height without corresponding reduction in the amplitude of oscillation of the locking pawl 7 during the normal operation of the retractor.

Figure 7A:
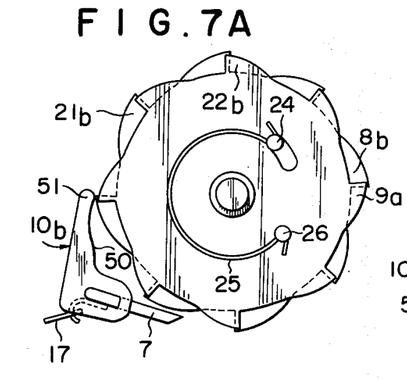
FIGS. 7A and 7B are partial side elevational views of a further modification of the retractor of FIGS. 1 and 2, the views being also explanatory of the operation of the modified retractor.
Figure 7B:
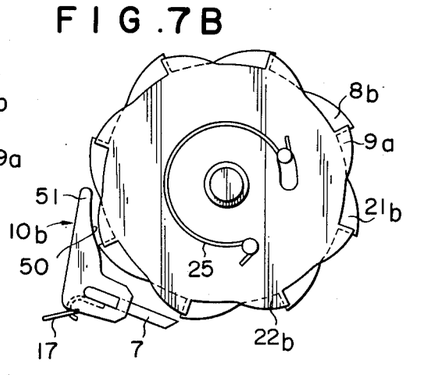

FIGS. 7A and 7B illustrate a further modification of the retractor 1 of FIGS. 1 and 2, in which modification one of the ratchet wheels or toothed flanges of the reel doubles as the cam wheel, and in which the inertia wheel is shaped in accordance with the teaching of FIGS. 4A and 4B. In the following description of FIGS. 7A and 7B, the said one of the toothed reel flanges will be referred to as the cam wheel and designated by 8b, even though it also functions as the ratchet wheel in the event of an emergency. The inertia wheel is designated 9a because it is shaped exactly like its previous example of FIGS. 4A and 4B.

The locking pawl 7 is provided with a follower lever 10b having a curved surface 50 adapted for sliding contact with the successive ratchet teeth of the cam wheel 8b. When the tip 51 of the follower lever 10b rides on the crest of one of the ratchet teeth of the cam wheel 8b as shown in FIG. 7A, the tips of the locking pawl 7 are each located intermediate two adjacent ratchet teeth. When the follower tip 51 is located intermediate between the crests of two adjacent ratchet teeth of the cam wheel 8b as shown in FIG. 7B, the locking pawl tips are each located over the crest of one of the ratchet teeth. Therefore, during rotation of the reel in the direction of belt extension at relatively low acceleration, the locking pawl 7 oscillates so as to permit unobstructed passage therepast of the successive ratchet teeth on the pair of reel flanges.

During the rotation of the cam wheel 8b from its angular position of FIG. 7B to that shown in FIG. 7A through an angle corresponding to half the pitch of the ratchet teeth thereon, the curved surface 50 of the follower lever 10b is maintained in sliding contact with the crest of one of the ratchet teeth of the cam wheel. It will thus be seen that one of the ratchet wheels of the retractor according to this invention can be employed as the cam wheel if the follower lever is provided with the curved surface 50. The other details of construction and operation are exactly as previously set forth in connection with the retractor 1 of FIGS. 1 and 2.

Figure 8:
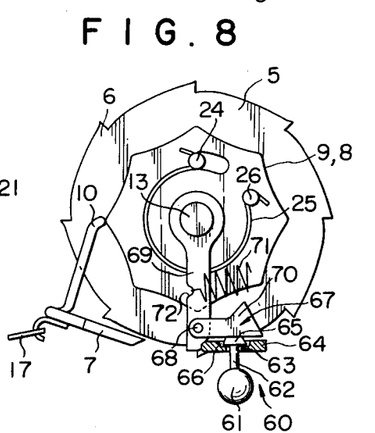
FIG. 8 is a partial side elevational view of a still further modification of the retractor of FIGS. 1 and 2.

In a further embodiment of the invention illustrated in FIG. 8, the retractor 1 of FIGS. 1 and 2 is additionally provided with a vehicle acceleration sensing mechanism 60 in order that the retractor may automatically lock at a predetermined degree of vehicle acceleration (deceleration) even though the angular acceleration of the reel in the direction of belt extension at that instant may be less than the threshold.

Referring more specifically to FIG. 8, the vehicle acceleration sensing mechanism 60 comprises a pendulum 61 having an arm 62 which extends with clearance through a hole 63 formed in a support 64 and which terminates in an enlarged head 65 loosely received in a depression 66 formed in the pendulum support 64. This pendulum support can be screwed or otherwise fastened to the retractor frame (shown at 2 in FIGS. 1 and 2) so as to be normally in a horizontal disposition. Resting upon the head 65 of the pendulum arm 62 is a brake member 67 which is pivotally pinned at 68 to a swivel arm 69 which is in turn pivotally mounted on one of the reel journals 13. The brake member 67 is formed to include a pawl 70 at its free end which is to be moved into and out of frictional contact with the inertia wheel 9.

As will be apparent from the foregoing, the vehicle acceleration sensing mechanism 60 is capable of translating the swinging motion of the pendulum 61 in any direction into the pivotal motion of the brake member 67 about the pivot pin 68. The rotation of the inertia wheel 9 can therefore be retarded or arrested each time the pawl 70 is urged into frictional contact therewith upon such pivotal motion of the brake member 67 in the counterclockwise direction.

The swivel arm 69 is urged to turn counterclockwise by a relatively heavy extension spring 71 which is anchored at one end to the retractor frame and engaged at the other end with a notch 72 formed in the swivel arm. Normally, the swivel arm 69 is maintained in the illustrated angular position as its free end abuts against a limit stop which is shown as the pendulum support 64. Thus, when the brake pawl 70 is subjected to excessive forces upon frictional contact with the inertia wheel 9, the swivel arm 69 is pivoted clockwise against the force of the spring 71 thereby protecting both the inertia wheel 9 and the brake member 67 from damage or rapid aging. It is of course possible to pivotally mount the swivel arm 69 on the retractor frame instead of on one of the reel journals.

In the operation of the embodiment of FIG. 8, when the vehicle accelerates (decelerates) to a predetermined degree, the swinging motion of the pendulum 61 is translated as aforesaid into the counterclockwise turn of the brake member 67 about the pivot pin 68, with the result that the pawl 70 of the brake member is urged into frictional contact with the inertia wheel 9. As a consequence, even though the rate of belt extension at that instant may not reach the predetermined threshold, the inertia wheel 9 lags behind the cam wheel 8 against the force of the spring 25 by approximately half the pitch of their protuberances, so that the locking pawl 7 simultaneously engages the pair of ratchet wheels 5 to lock the reel against any further rotation in the direction of belt extension. Both the pendulum 61 and the brake member 67 return to their normal positions of FIG. 8 under their own weight upon cessation of the vehicle acceleration.

The above described embodiment of FIG. 8 is open to a variety of minor modifications. For example, while the vehicle acceleration sensing mechanism 60 is shown to have the pendulum 61, a ball displaceably housed in a suitable enclosure may be employed in place of the pendulum. It is also possible to provide the inertia wheel 9 with teeth such that the brake member 67 will pivot into and out of positive engagement therewith.

Figure 9:
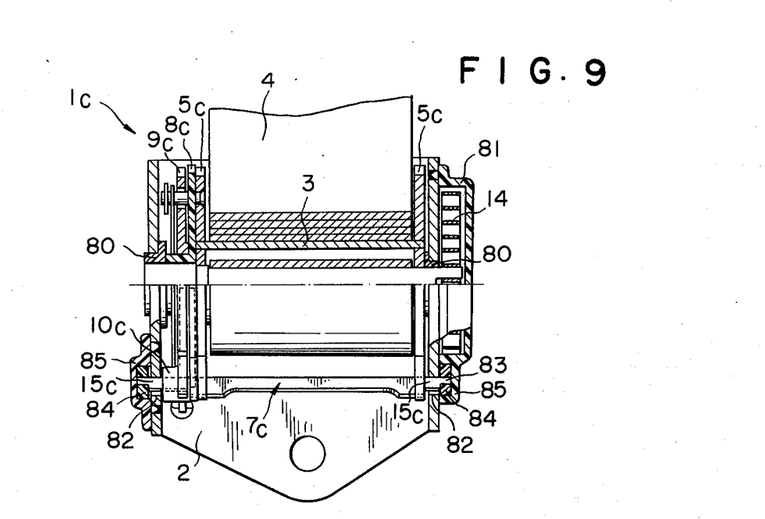
FIG. 9 is a front elevational view, partly in vertical section, of another preferred form of the emergency locking seat belt retractor according to the invention.
Figures 10, 11:
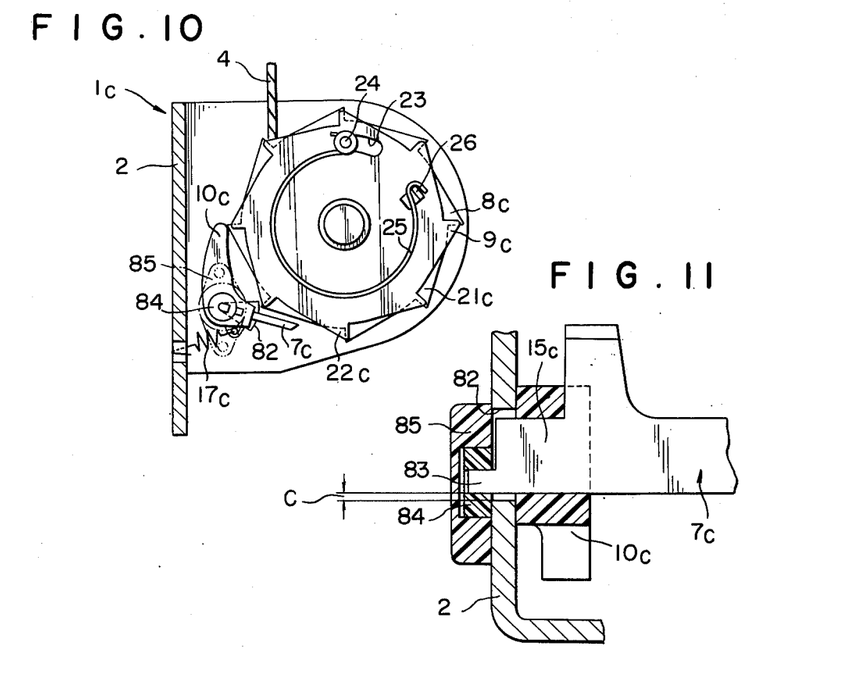
FIG. 10 is a left hand side elevational view showing the retractor of FIG. 9 with one of the side walls of its frame removed.
FIG. 11 is an enlarged, fragmentary sectional view showing the way the locking pawl of the retractor of FIG. 10 is pivotally supported at each end on the frame.

FIGS. 9 through 11 illustrate a further embodiment of the invention which incorporates various means for suppression of the noise which may be produced during the normal use of the retractor shown, for example, in FIGS. 1 and 2. The noiseless retractor, as it may be properly called, is illustrated in its entirety in FIGS. 9 and 10 and is therein generally designated by 1c.

With particular reference to FIG. 10, the cam wheel 8c and follower lever 10c of this noiseless retractor 1c are shown shaped in accordance with the teachings of FIGS. 7A and 7B, whereas the inertia wheel 9c is shown shaped in accordance with the teachings of FIGS. 4A and 4B. The pair of ratchet wheels 5c are unseen in FIG. 10 because in its embodiment, they are made slightly less in diameter than the cam wheel 8c, for purposes hereinafter made apparent. The cam wheel 8c and the follower lever 10c are both molded of plastics material capable of absorbing vibrations. The cam wheel 8c in particular, which makes violent contact with other parts, should preferably be molded of polyurethane rubber or the like.

It should be noted that the term "plastics" is used herein in the broad sense. Thus, it includes materials that might be classifiable as, for example, an elastomer, a rubber, or a resin.

As shown in FIG. 9, the reel 3 has its pair of journals rotatably supported by the frame 2 via bushings 80 which also can be molded of plastics. The spiral spring 14, urging the reel 3 to rotate in the direction of belt extension, is shown completely enclosed in a spring housing 81, also of plastics, that is suitably fastened to one of the side walls of the frame 2.

According to a further feature of this noiseless retractor 1c, the pair of lugs 15c of the locking pawl 7c are loosely received in the respective sectorial openings 82 formed in the side walls of the frame 2 and are further provided with portions 83 projecting outwardly of the sectorial openings. These projecting portions 83 of the locking pawl 7c are provided with a pair of journals 84 which are rotatably received in bearings 85 suitably mounted on the side walls of the frame 2, respectively. Both the journals 84 and the bearings 85 are molded of plastics, and the right hand one, as viewed in FIG. 9, of the bearings 85 is shown as an integral part of the spring housing 81.

With the locking pawl 7c thus pivotally supported by the journals 84 and bearings 85, there exists a clearance C between locking pawl and frame at the apex of each sectorial opening 82, as illustrated in detail in FIG. 11. Normally, therefore, there is no direct metal-to-metal contact between frame 2 and locking pawl 7c. When the locking pawl 7c is subjected to an excessive load upon engagement with the pair of ratchet wheels 5c in the event of an emergency, the pair of bearings 85 are distorted or broken, and the frame 2 acts in their stead to bear the load on the locking pawl. The other details of construction of this noiseless retractor are identical with those of the retractor 1 of FIGS. 1 and 2, except that a helical extension spring 17c is employed in lieu of the wire 17 for urging the follower lever 10c against the cam wheel 8c.

The operation of the noiseless retractor 1c is also believed apparent from the description of the preceding embodiments. It may be mentioned, however, that during the operation of the belt retraction, this noiseless retractor will produce no such clicks as those produced by, for example, the retractor 1 of FIGS. 1 and 2. In the retractor of FIGS. 1 and 2, the locking pawl 7 may oscillate with an amplitude in excess of the desired limits against the force of the spring 17 upon rapid rotation of the reel in the direction of belt retraction, so that the locking pawl may repeatedly strike the pair of ratchet wheels 5 at points intermediate between the crests of the teeth thereon, resulting in the production of objectionalbe clicks.

In the noiseless retractor 1c of FIGS. 9 through 11, the pair of ratchet wheels 5c are made slightly less in diameter than the cam wheel 8c, as previously mentioned, and the locking pawl 7c is adapted to strike against the cam wheel when it is pivoted too far toward the ratchet wheels during reel rotation in the direction of belt retraction. No objectionable clicks are produced upon contact of the locking pawl with the cam wheel because the latter is molded of plastics as aforesaid.

It will now be seen that the noiseless retractor 1c succeeds in avoiding any metal-to-metal contact between its working parts in normal use without impairment of its strength, since the cam wheel 8c, follower lever 10c, bushings 80, journals 84 and bearings 85 are all molded of plastics, whereas the frame 2, ratchet wheels 5c, locking pawl 7c and so forth may be made of metal. It should further be noted that the transmission of soundproducing vibrations to the frame 2 is minimized by the provision of the bushings 80 and the bearings 85 together with the journals 84.

The various forms of the emergency locking seat belt retractor hereinbefore described have in common the problem that if the reel is allowed to rotate too fast during belt retraction under the force of the spiral spring, the locking pawl may be accidentally thrown into engagement with the pair of ratchet wheels upon completion of the belt retraction, thereby locking the reel against rotation in the direction of belt extension. When thus locked accidentally upon full retraction of the belt, the reel cannot be easily unlocked because it is not rotatable any further in the direction of belt retraction.

Figure 12:
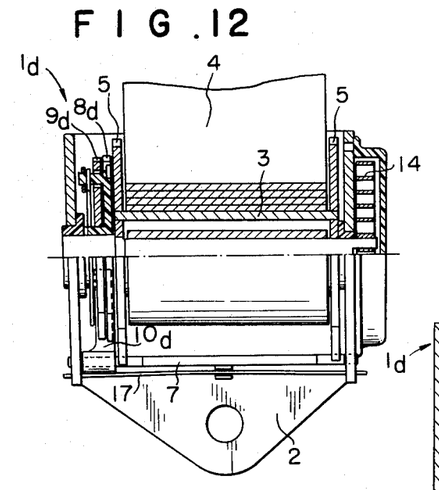
FIG. 12 is a front elevational view, partly in vertical section, of a further preferred form of the emergency locking seat belt retractor according to the invention.
Figure 13:
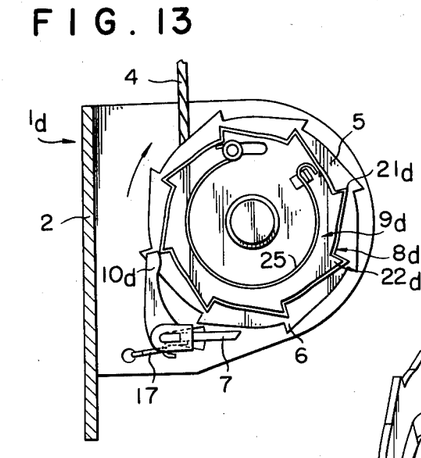
FIG. 13 is a left hand side elevational view showing the retractor of FIG. 12 with one of the side walls of its frame removed.
Figure 14:
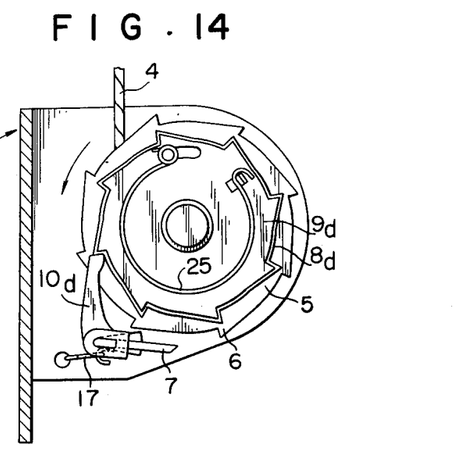
FIG. 14 is a view similar to FIG. 13 but showing a cam wheel of the retractor engaged with a follower lever during rotation of the reel in the direction of belt retraction.

In order to obviate the problem pointed out in the preceding paragraph, a further preferred embodiment of the invention illustrated in FIGS. 12 through 15 incorporates a one-way clutch which permits the cam and inertia wheels to rotate with the reel only in the direction of belt extension. In FIGS. 12 through 14 the retractor is generally designated by 1d and is shown to comprise cam and inertia wheels 8d and 9d of identical shape.

The cam wheel 8d, for example, has formed on its periphery a series of protuberances 21d which are substantially in the shape of ratchet teeth disposed at the same angular spacings as the teeth on the pair of ratchet wheels 5 but oriented in the opposite direction to the ratchet wheel teeth. The inertia wheel 9d, identical in shape with the cam wheel 8d but slightly less in diameter than same, normally has its ratchet-tooth-like protuberances 22d in precise alignment with the cam wheel protuberances 21d in the axial direction of the cam and inertia wheels.

In this retractor 1d, the cam wheel 8d is loosely mounted on one of the journals of the reel 3. It should further be noted that the follower lever 10d of the retractor 1d is adapted to serve the dual purpose of following the contour of the cam wheel 8d during reel rotation in the direction of belt extension, as shown in FIG. 13 and of locking the cam and inertia wheels against rotation during reel rotation in the direction of belt retraction by engaging one of the cam wheel protuberances 21d, as shown in FIG. 14.

Figure 15:
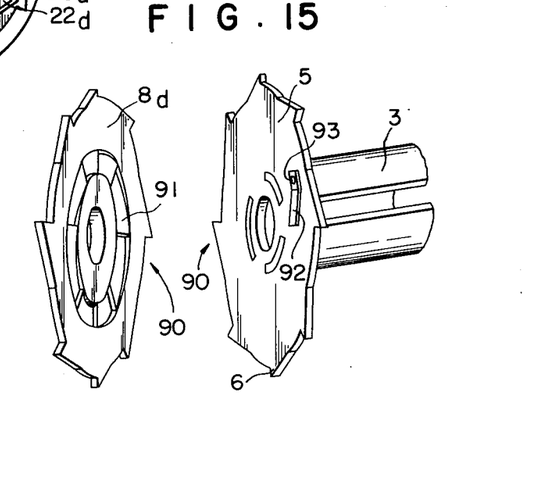
FIG. 15 is an exploded perspective view showing a one-way clutch provided between the cam wheel and one of the ratchet wheels in the retractor of FIGS. 12 and 13.

As illustrated in exploded perspective in FIG. 15, a one-way clutch 90 is provided between the cam wheel 8d and one of the ratchet wheels 5 for permitting the former to rotate with the latter only during reel rotation in the direction of belt extension. The one-way clutch 90 comprises a series of ratchet teeth 91 formed in annular arrangement on one of the faces of the cam wheel 8d, and a pawl 92 in the form of a leaf spring affixed at 93 to the confronting face of one of the ratchet wheels 5 in a cantilever fashion so as to be self-biased into constant contact with the ratchet teeth 91. The pawl 92 will hereinafter be referred to as the clutch pawl in contradistinction to the locking pawl 7.

Notwithstanding in indication in FIG. 15, it is of course possible to form the annular row of ratchet teeth 91 on one of the ratchet wheels 5 and to affix the clutch pawl 92 to the cam wheel 8d.

Thus, upon rotation of the reel 3 in the direction of belt extension, the clutch pawl 92 on one of the ratchet wheels 5 engages one of the ratchet teeth 91 to permit the cam wheel 8d (and the inertia wheel 9d) to rotate with the reel. Upon reel rotation in the direction of belt retraction, the clutch pawl 92 merely slides over the ratchet teeth 91 so that the cam wheel 8d is held out of rotation.

It is important to note that the ratchet teeth 91 of the one-way clutch 90 are equal in number to the protuberances 21d of the cam wheel 8d and therefore to the teeth on each of the ratchet wheels 5. As a consequence, the relative angular positions of the ratchet wheels 5 and the cam wheel 8d (and the inertia wheel 9d) are unchanged regardless of which one of the ratchet teeth 91 is engaged by the clutch pawl 92 upon reel rotation in the direction of belt extension, as will be seen upon consideration of FIG. 13. The other details of construction are as previously set forth in connection with the retractor 1 of FIGS. 1 and 2.

In the operation of the retractor 1d of FIGS. 12 through 15, the cam and inertia wheels 8d and 9d are both rotated with the pair of ratchet wheels 5 via the one-way clutch 90 upon extension of the belt 4 in the normal operating condition of the seat belt assembly incorporating the retractor. As will be apparent from FIG. 13, the locking pawl 7 is then oscillated via the follower lever 10d so as to permit unobstructed passage therepast of the successive teeth on the pair of ratchet wheels 5, as in all the preceding embodiments of this invention. Upon a high acceleration being imparted to the belt 4, as in the event of an emergency, the locking pawl 7 simultaneously engages the pair of ratchet wheels 5 to lock the reel 3 against any further rotation in the direction of belt extension, through the procedure which is believed apparent from the foregoing description.

Upon rotation of the reel 3 in the direction of belt retraction under the force of the spiral spring 14, the one-way clutch 90 disengages the cam wheel 8d from one of the ratchet wheels 5, and the cam wheel is further restrained from rotation as the follower lever 10d is urged into engagement with one of the ratchet-tooth-like protuberances 21d of the cam wheel by the wire spring 17, as shown in FIG. 14. With the follower lever 10d thus engaged with the cam wheel 8d, the locking pawl 7 is held pivoted away from the pair of ratchet wheels 5. Consequently, no matter how fast the reel 3 is rotated in the direction of belt retraction under the force of the spiral spring 14, there is practically no possibility of the locking pawl 7 being accidentially thrown into engagement with the pair of ratchet wheels 5 upon full retraction of the belt.

Figure 16:
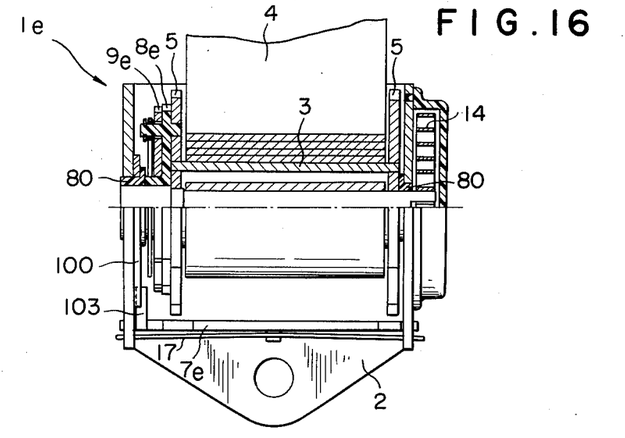
FIG. 16 is a front elevational view, partly in vertical section, of a further preferred form of the emergency locking seat belt retractor according to the invention.
Figures 17, 18:
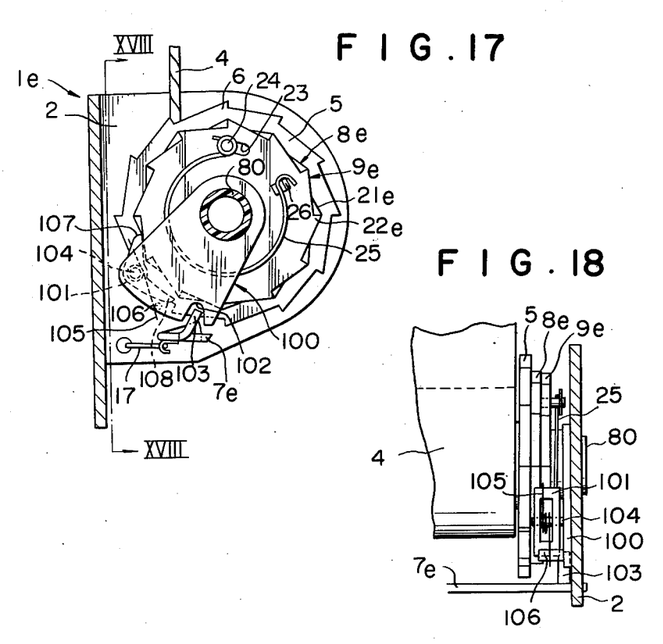
FIG. 17 is a left hand side elevational view showing the retractor of FIG. 16 with one of the side walls of its frame removed.
FIG. 18 is a fragmentary vertical sectional view taken along the line XVIII—XVIII of FIG. 17 as viewed in the arrow direction.

FIGS. 16 through 20 illustrate a further embodiment of the invention which, unlike all the preceding embodiments, has its locking pawl held stationary during the rotation of the reel in the directions of both belt extension and retraction in normal use. With reference to FIGS. 16 and 17 in particular, wherein the retractor is generally designated by 1e, it will be seen that the cam and inertia wheels 8e and 9e of this retractor are of the type incorporated in the noiseless retractor 1c of FIGS. 9 through 11, with the ratchet-tooth-like protuberances 21e of the cam wheel oriented in the same direction as the teeth on the pair of ratchet wheels 5 and in the opposite direction to the ratchet-tooth-like protuberances 22e of the interia wheel.

Instead of the follower lever used in the preceding embodiments, the retractor 1e employs as actuator lever 100 and a two-armed follower lever 101 which coact to cause a locking pawl 7e to pivot into engagement with the pair of ratchet wheels 5 in the event of an emergency. The actuator lever 100 is loosely mounted at one end on one of the bushings 80 through which the pair of journals of the reel 3 are rotatably supported by the frame 2, so that the actuator lever is pivotable relative to the frame about the axis of the reel. The actuator lever 100 has formed in its free end a notch 102 in which there is loosely engaged an upturned portion 103 of the locking pawl 7e. Normally, the lcoking pawl 7e is held out of engagement with the pair of ratchet wheels 5 under the force of the wire spring 17.

With reference to both FIGS. 17 and 18, the actuator lever 100 is further provided with a pivot pin 104 on its free end for pivotally supporting the two-armed follower lever 101 at its intermediate point. A torsion spring 105 wound around the pivot pin 104 has one of its ends engaged with the follower lever 101 and the other end with a projection 106 on the actuator lever 100, in such a way that the follower lever is urged to turn clockwise as viewed in FIG. 17.

The follower lever 101 has first and second arms 107 and 108 on opposite sides of its fulcrum at 104. Normally urged against the toothed periphery of the cam wheel 8e under the bias of the torsion spring 105, the first arm 107 of the follower lever is, in effect, a follower lever shaped in accordance with the teaching of FIGS. 7A and 7B. The second arm 108 of the follower lever is, again in effect, a pawl engageable with one of the ratchet-tooth-like protuberances 21e of the cam wheel 8e in the event of an emergency.

Normally, however, when the tip of the first lever arm 107 is located intermediate the crests of any two adjacent protuberanes 21e of the cam wheel 8e as shown in FIG. 17, the tip of the second lever arm 108 is located over the crest of one of the cam wheel protuberances. When the tip of the first lever arm 107 rides on the crest of one of the cam wheel protuberances 21e, the tip of the second lever arm 108 is located intermediate the crests of two adjacent cam wheel protuberances. Thus, during the rotation of the reel 3 in the direction of belt extension or retraction in the normal use of the retractor 1e, the second lever arm 108 oscillates so as to permit unobstructed passage therepast of the cam wheel protuberances 21e.

Figure 19:
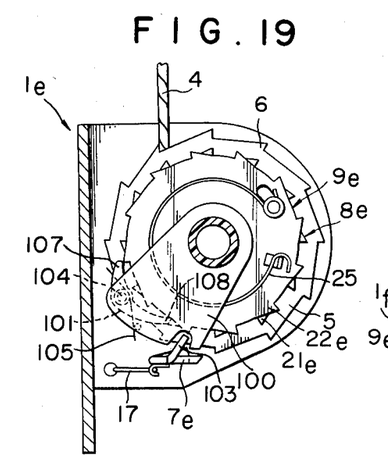
FIG. 19 is a view similar to FIG. 17 but showing a follower lever of the retractor engaged with the cam wheel upon a high acceleration of the reeel in the direction of belt extension.

As best shown in FIG. 18, the first lever arm 107 of the follower lever 101 has sufficient width to be acted upon by the inertia wheel 9e as well, which is slightly less in diameter than the cam wheel 8e, when the inertia wheel lags behind the cam wheel against the force of the spring 25 upon rapid reel rotation in the direction of belt extension as in the event of an emergency. Thereupon the protuberances 21e and 22e of the cam and inertia wheels 8e and 9e coact to substantially hold the second lever arm 108 pivoted toward the cam wheel via the first lever arm 107 against the force of the spring 105, thereby causing the second lever arm to engage one of the cam wheel protuberances as shown in FIG. 19.

Since the follower lever 101 comprising the first and the second arms 107 and 108 is mounted on the actuator lever 100 as aforesaid, the latter is pivoted clockwise upon engagement of the second lever arm with the cam wheel 8e. Upon such clockwise turn of the actuator lever 100, the locking pawl 7e is thereby pivoted counterclockwise via its upturned portion 103 against the force of the spring 17 as shown in FIG. 20 and is thus moved into engagement with the pair of ratchet wheels 5 to lock the reel 3 against any further rotation in the direction of belt extension.

Figure 20:
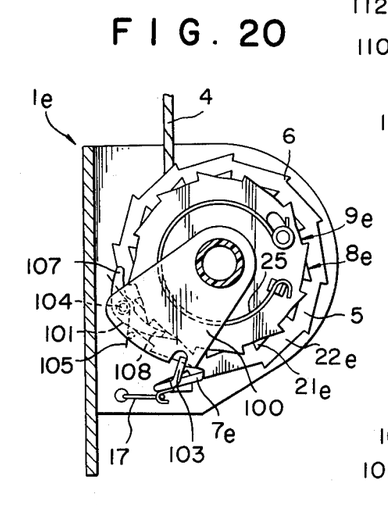
FIG. 20 is also a view similar to FIG. 17 but showing the locking pawl of the retractor engaged with the pair of ratchet wheels to lock the reel against rotation in the direction of belt extension.
Figure 21:
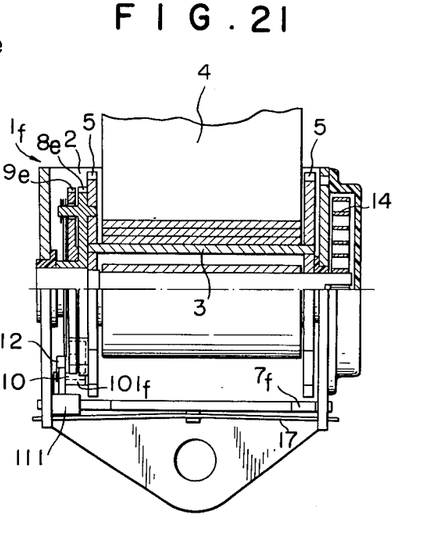
FIG. 21 is a front elevational view, partly in vertical section, of a still further preferred form of the emergency locking seat belt retractor according to the invention.
Figure 22:
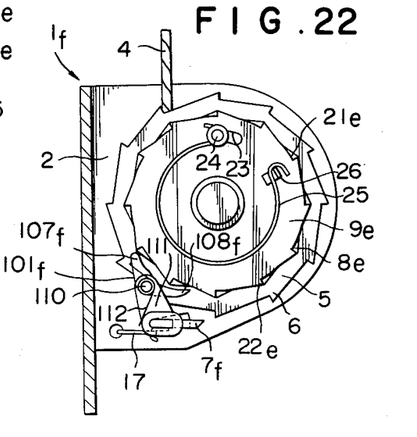
FIG. 22 is a left hand side elevational view showing the retractor of FIG. 21 with one of the side walls of its frame removed.

For positively locking the reel 3 of the retractor 1e against rotation in the direction of belt extension in the above described manner, the actuator lever 100 must be turned clockwise as in FIG. 20 immediately before one of the teeth on each ratchet wheel 5 turns to a position engageable with the locking pawl 7e; otherwise, the locking pawl when actuated by the actuator lever would contact each ratchet wheel at a point so far away from the next tooth thereon that the ratchet wheels would be allowed to rotate through some additional angle whereas the actuator lever would be restrained from any further clockwise turn about the axis of the reel. The cam wheel 8e, actuator lever 100, follower lever 101 and so forth would then be overloaded and, in the worst case, incur irreparable damage. This problem can be overcome either by manufacturing the various woring parts of the retractor 1e to very close tolerances or, far more easily, by providing a flexible connection between locking pawl 7e and actuator lever 100.

The belt 4 can be automatically wound up by the reel 3 under the force of the spiral spring 14 when loosened after the emergency locking of the reel, since then the second arm 108 of the follower lever 101 is disengaged from the cam wheel 8e under the force of the spring 105. The locking pawl 7e is also disengaged and held pivoted away from the pair of ratchet wheels 5 under the force of the spring 17. The other details of construction and operation of the retractor 1e are believed evident from the description of the preceding embodiments.

It should be appreciated that since the locking pawl 7e of the retractor 1e, which must of necessity be made of metal, is held stationary in the normal use of the retractor, the noise production of this retractor is minimized, and its useful life is also significantly extended. Although the follower lever 101 oscillates instead of the locking pawl 7e, this lever can be molded of plastics, so that the noise production due to the oscillation of the lever is negligible.

The retractor 1f illustrated in FIGS. 21 through 24 is a slight modification of the retractor 1eof FIGS. 16 through 20, differing therefrom only in that the follower lever 101f comprising the first and the second arms 107f and 108f is pivotally pinned at 110 to an actuator member 111, instead of to the actuator lever 100, that is fixedly mounted directly on the locking pawl 7f. The follower lever 101f is urged to turn clockwise, as viewed in FIG. 22, by a torsion spring 112 wound around the pivot pin 110. The othe parts of the retractor 1f, constructed and arranged in strict accordance with the retractor 1e of FIGS. 16 through 20, are identified by the same reference characters as those used to identify the corresponding parts of the retractor 1e.

Figure 23:
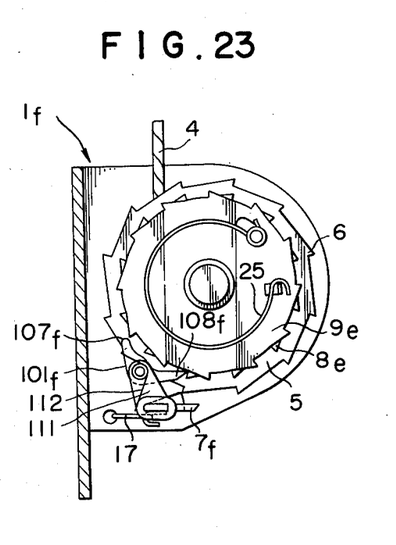
FIG. 23 is a view similar to FIG. 22 but showing the follower lever of the retractor engaged with the cam wheel upon a high acceleration of the reel in the direction of belt extension.

The operation of this retractor 1f in its normal use is considered self-evident from the foregoing description of the operation of the retractor 1e of FIGS. 16 through 20, so that only the emergency locking operation of the retractor 1f will be briefly described with reference to FIGS. 23 and 24. Upon rapid rotation of the reel 3 in the direction of belt extension, the inertia wheel 9e lags behind the cam wheel 8e against the force of the spring 25, with the result that the second arm 108f of the follower lever 101f is pivoted into engagement with one of the ratchet-tooth-like protuberances of the cam wheel against the force of the spring 112 as shown in FIG. 23.

Figure 24:
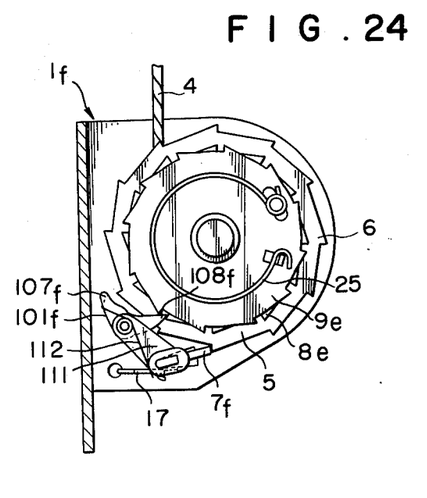
FIG. 24 is also a view similar to FIG. 22 but showing the locking pawl of the retractor engaged with the pair of ratchet wheels to lock the reel against rotation in the direction of belt extension.

With the continued rotation of the cam wheel 8e with the reel 3 through some slight additional angle, the follower lever 101f in engagement with the cam wheel causes the locking pawl 7f to pivot counterclockwise against the force of the spring 17 via the actuator member 111, as illustrated in FIG. 24. The locking pawl 7f thus similtaneously engages the pair of ratchet wheels 5 to lock the reel 3 against any further rotation in the direction of belt extension.

It will be understood that this retractor 1f also possesses the advantages of low noise production and improved durability. The retractor 1f is not free, however, from the aforementioned problem encountered with the retractor 1e of FIGS. 16 through 20 in relation to its emergency locking operation. In the case of the retractor 1f, this problem can be overcome either by manufacturing its various working parts to close tolerances, by providing a flexible connection between locking pawl 7f and actuator member 111, or by molding the actuator member itself of suitably flexible material such as some elastomers.

Although the emergency locking seat belt retractor according to this invention has been shown and described in terms of what are believed to be its perferred forms, it is understood that these are purely for the purpose of illustrating or explaining the invention. Numerouschanges or modifications of the preferrd forms of the retractor as disclosed herein will occur to those skilled in the art without departing from the spirit or scope of the invention.

We claim:

1. An emergency locking retractor for a seat belt assembly comprising, in combination, a frame, a reel rotatably supported by said frame and having a belt thereon, first resilient means urging to said reel to rotate in a direction of belt retraction, toothed wheel means rotatable with said reel, said toothed wheel means having teeth or protuberances on and along its periphery at a predetermined pitch, a locking pawl pivotally mounted on said frame for movement into and out of engagement with said teeth or protuberances of said toothed wheel means, said locking pawl being effective to lock said reel against rotation in a direction of belt extension upon engagement with said toothed wheel means, inertia wheel means having protuberanes on and along its periphery at the same pitch as said predetermined pitch and disposed in coaxial relationship to said toothed wheel means so as to be rotatable through a predetermined angle relative to the same, second resilient means for normally holding said inertia wheel means in a predetermined angular position relative to said toothed wheel means, where said protuberances of said toothed wheel means and of said inertia wheel means are at the same phase, and for permitting said inertia wheel means to rotate in synchronism with said toothed wheel means during normal rotation of said reel in the direction of belt extension at relatively low acceleration, said second resilient means yielding upon a high acceleration in exccess of a predetermined value being imparted to said reel in the direction of belt extension to permit angular displacement of said inertia wheel means through said predetermined angle relative to said toothed wheel means so as to cause a difference in phase of said protuberances between the toothed wheel means and the inertia wheel means, as well as a change in combined peripheral contour formed by the protuberances of the toothed wheel means and the inertia wheel means, a pivotally supported follower lever following the combined peripheral contour formed by said protuberances, third resilient means urging said follower lever toward the peripheral contour whereby said follower lever is normally held in sliding contact with at least said toothed wheel means and oscillates in conformity with the combined peripheral contour, and means associating said follower lever with said locking pawl in a manner such that the locking pawl permits unobstructed passage therepast of said teeth or protuberances on said toothed wheel means during said normal rotation of the reel and, upon occurence of said change in combined peripheral contour, is held pivoted toward said toothed wheel means for engagement therewith.

2. An emergency locking retractor as claimed in claim 1, wherein said toothed wheel means comprises a ratchet wheel means being movable with said reel and having said teeth for engagement with said locking pawl, and a cam wheel means rotatable with said reel at least in the direction of belt extension, said cam wheel means having said protuberances on and along its periphery at said predetermined pitch, which protuberances said follower lever follows.

3. An emergency locking retractor as claimed in claim 1, wherein said toothed wheel means is a ratchet wheel means fixed to said reel for engagement with said locking pawl.

4. An emergency locking retractor as claimed in claim 2, wherein said protuberancs formed on said cam wheel means and said inertia wheel means are at the same pitch as the teeth on said ratchet wheel means, and wherein said predetermined angle corresponds to approximately half the pitch of said protuberances of said cam wheel means and said inertia wheel means.

5. An emergency locking retractor as claimed in claim 1, wherein said follower lever is fixedly connected to said locking pawl.

6. An emergency locking retractor as claimed in claim 2, wherein said protuberances of said inertia wheel means substantially in the shape of ratchet teeth each having a sloping side disposed forwardly with respect to the direction of rotation of said inertia wheel means during belt extension, whereby said inertia wheel means is angularly displaced relative to said cam wheel means immediately upon said high acceleration being imparted to said reel in the direction of belt extension regardless of the position of said follower lever on said cam wheel means.

7. An emergency locking retractor as claimed in claim 4, wherein said follower lever is pivotally supported at one end on said frame and operatively engaged with said locking pawl at the other end, and said third resilient means is effective to urge said locking pawl away from said ratchet wheel means and to urge said follower lever toward said cam and inertia wheel means, whereby said follower lever is normally held in sliding contact with at least said cam wheel means at a point intermediate said ends thereof, said follower lever being adapted to be acted upon by both of said cam and inertia wheel means upon angular displacement of the latter through said predetermined angle relative to the former, whereby said locking pawl is oscillated by said cam wheel means via said follower lever so as to permit unobstructed passage therepast of said teeth on said ratchet wheel means during rotation of said reel in the direction of belt extension at relatively low speed and, upon said high acceleration being imparted to said reel in the direction of belt extension, is substantially held pivoted toward said ratchet wheel means for engagement therewith.

8. An emergency locking retractor as claimed in claim 1, further comprising acceleration sensing means for sensing the acceleration of the retractor, and brake means actuated by said acceleration sensing means upon acceleration of the retractor to a predetermined degree, said brake means being effective on actuation to engage said inertia wheel means for causing angular displacement thereof through said predetermined angle relative to said cam wheel means against the force of said second resilient means.

9. An emergency locking retractor as claimed in claim 8, wherein said acceleration sensing means comprises a pendulum, and means on said frame for swingably supporting said pendulum, and wherein said brake means comprises a brake member pivotable into and out of engagement with said inertia wheel means in response to the swinging motion of said pendulum.

10. An emergency locking retractor as claimed in claim 9, further comprising a swivel arm pivotally mounted at one end on said frame, said brake member being pivotally mounted on said swivel arm adjacent the other end thereof, fourth resilient means urging said swivel arm to pivot in one direction, and stop means for limiting the pivotal motion of said swivel arm in said one direction against the force of said fourth resilient means, whereby said swivel arm is pivoted in a direction opposite to said one direction against the force of said fourth resilient means when said brake member is overloaded upon engagement with said inertia wheel means.

11. An emergency locking retractor as claimed in claim 1, wherein said locking pawl is pivotally mounted on said frame via bearing means made of material capable of absorbing vibrations, whereby said locking pawl is normally held out of direct contact with said frame.

12. An emergency locking retractor as claimed in claim 2, wherein said cam wheel means is made of material capable of abosrbing vibrations.

13. An emergency locking retractor as claimed in claim 12, wherein said cam wheel means is slightly greater in diameter than said ratchet wheel means, and wherein said locking pawl is adapted to strike said cam wheel means instead of said ratchet wheel means when pivoted too far toward said ratchet wheel means in the normal use of the retractor.

14. An emergency locking retractor as claimed in claim 2, further comprising one-way clutch means provided between said ratchet wheel means and said cam wheel means, whereby said cam wheel is rotatable with said reel only during rotation of the latter in the direction of belt extension.

15. An emergency locking retractor as claimed in claim 14, wherein said one-way clutch means comprises a series of ratchet teeth formed in annular arrangement on either of said ratchet wheel means and said cam wheel means, and a clutch pawl on the other of said ratchet wheel means and said cam wheel means for selectively engaging one of said ratchet teeth of said one-way clutch means upon rotation of said reel in the direction of belt extension, said ratchet teeth of said one-way clutch means being equal in number to said teeth on said ratchet wheel means and to said protuberances on each of said cam and inertia wheel means, whereby the relative angular positions of said ratchet wheel means and said cam wheel means are held constant regardless of which one of said ratchet teeth is engaged by said clutch pawl upon rotation of said reel in the direction of belt extension.

16. An emergency locking retractor as claimed in claim 14, wherein said protuberances of each of said cam and inertia wheel means are substantially in the shape of ratchet teeth, and wherein said follower lever is adapted to engage one of said ratchet-tooth-like protuberances of at least said cam wheel means for locking the same against rotation upon rotation of said reel in the direction of belt retraction, whereby said locking pawl is held pivoted away from said ratchet wheel means during rotation of said reel in the direction of belt retraction.

17. An emergency locking retractor as claimed in claim 2, wherein said means for associating said follower lever with said locking pawl comprises an actuator lever mounted on said frame for pivotal movement about the axis of said cam and inertia wheel means, said actuator lever having a free and operatively engaged with said locking pawl fourth resilient means said locking pawl away from said ratchet wheel means, and means for pivotally supporting said follower lever at its intermediate point on said free end of said actuator lever, said follower lever having first and second arms on both sides of said intermediate point thereof, said third resilient means being on said actuator lever and urging said first arm of said follower lever toward said cam and inertia wheel means whereby said first arm of said follower lever is normally held in sliding contact with at least said cam wheel means, said first arm of said follower being adapted to be acted upon by both of said cam and inertia wheel means upon angular displacement of the latter through said predetermined angle relative to the former, whereby said second arm of said follower lever oscillates so as to permit unobstructed passage therepast of said ratchet-tooth-like protuberances of said cam wheel means during rotation of said reel in the direction of belt extension at relatively low acceleration and, upon said high acceleration being imparted to said reel in the direction of belt extension, is substantially held pivoted toward said cam wheel means for engagement therewith, whereupon said actuator lever is pivoted in the direction of rotation of said cam wheel means for pivoting said locking pawl into engagement with said ratchet wheel means against the force of said fourth resilient means.

18. An emergency locking retractor as claimed in claim 2, wherein said means for associating said follower lever with said locking pawl comprises an actuator member secured to said locking pawl, fourth resilient means urging said locking pawl away from said ratchet wheel means, and means for pivotally supporting said follower lever at its intermediate point on said actuator member, said follower lever having first and second arms on both sides of said intermediate point thereof, said third resilient means being on said actuator member and urging said first arm of said sensing lever toward said cam and inertia wheel means whereby said first arm of said follower lever is normally held in sliding contact with at least said cam wheel means, said first arm of said follower lever being adapted to be acted upon by both of said cam and inertia wheel means upon angular displacement of the latter through said predetermined angle relative to the former, whereby said second arm of said follower lever oscillates so as to permit unobstructed passage therepast of said ratchet-tooth-like protuberances of said cam wheel means during rotation of said reel in the direction of belt extension at relatively low acceleration and, upon said high acceleration being imparted to said reel in the direction of belt extension, is substantially held pivoted toward said cam wheel means for engagement therewith, whereupon said locking pawl is pivoted into engagement with said ratchet wheel means via said actuator member against the force of said fourth resilient means.

* * * * *